United States Patent Office 3,663,629
Patented May 16, 1972

3,663,629
PROCESS FOR THE PREPARATION OF
1,1-DIHYDROPERFLUOROALKANOLS
Hartmut Fischer, Kelkheim, Taunus, Germany, assignor to Farbwerke Hoechst Aktiengesellschaft vormals Meister Lucius & Bruning, Frankfurt am Main, Germany
No Drawing. Filed Aug. 13, 1970, Ser. No. 63,617
Claims priority, application Germany, Sept. 2, 1969,
P 19 44 381.3
Int. Cl. C07c 31/34
U.S. Cl. 260—633       9 Claims

ABSTRACT OF THE DISCLOSURE

The hydrogenation of perfluoroalkane carboxylic acids and the lower alkanol esters thereof at elevated temperatures and pressures with a ruthenium catalyst in an aqueous system yields pure 1,1-dihydro-perfluoro alkanols in high yields. The products are useful intermediates, e.g. for the synthesis of water- and oil repellent agents.

The present invention relates to a process for the preparation of 1,1-dihydroperfluoroalkanols.

The hydrogenation of carboxylic acid esters at elevated temperatures and pressures, preferably by employing copper-chromium-oxide catalysts, is generally known (Houben-Weyl, Methoden der Organischen Chemie IV/2, 318). It normally results, with a good yield, in alcohols having the same number of carbon atoms. Perfluorocarboxylic acid esters, such as heptafluorobutyric acid butyl esters, however, allow only a modest yield, even at high hydrogen pressures, when converted in the presence of copper-chromium-oxide catalysts into the corresponding 1,1-dihydroperfluoroalkanols-1 (Industrial and Engineering Chemistry, product research and development, 4, 101, 1965). According to the process of U.S. patent specification 2,862,977, however, it is possible to hydrogenate the perfluorocarboxylic acids, especially the perfluorooctanoic acid, when using a catalyst consisting of 5% of ruthenium on carbon. But this process has the disadvantage that it is operated with an inert organic solvent, preferably with diethylether, and therefore a distillation is undispensable after the reaction. On account of the high volatility of the 1,1-dihydroperfluorooctanol-1 as well as of the perfluorooctanoic acid, however, a simple separation of the product from starting material and solvent by distillation is only unsatisfactory. Furthermore, the 1,1-dihydroperfluorooctanol-1 obtained according to this process in a moderate yield is only of little purity. Another disadvantage is that 19.2 percent by weight of catalyst used, calculated on the perfluorooctanoic acid employed, represents a relatively high amount.

It has now been found that 1,1-dihydroperfluoroalkanols-1 of the general formula

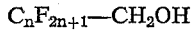

wherein $n$ is a number equal to or greater than 3, preferably from 3 to 12, especially 3 to 10, may be obtained by hydrogenation of perfluoro-carboxylic acids or esters thereof having the general formula

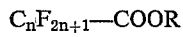

wherein $n$ is defined as above and R represents a hydrogen atom or an alkyl group of preferably 1 to 4 carbon atoms, especially a methyl or ethyl group, using a ruthenium catalyst, in a smooth reaction and with good to very good yields, when the hydrogenation is performed in the presence of 4–1000 percent by weight of water, calculated on the amount of perfluoro-carboxylic acid respectively ester used in the reaction, at elevated temperature and elevated hydrogen pressures.

The process according to invention permits the hydrogenation of, for example, perfluorobutyric acid, perfluorodecanoic acid or higher perfluorocarboxylic acids. According to the process there are preferably prepared 1,1-dihydroperfluorooctanols and 1,1-dihydroperfluorononanols from perfluorooctanoic acid respectively perfluorononanoic acid.

When proceeding discontinuously, the reaction vessel is charged with the compound to be hydrogenated, catalyst and water, whereupon the reaction is started by heating after pressurizing with hydrogen. With regard to a quick and quantitative reaction, it is suitable to agitate well in order to maintain the catalyst in suspension and furthermore well to contact the reaction mixture with the gas phase. Due to the high corroding effect of the perfluorocarboxylic acid-water-mixture, the reaction vessel must consist of an acid-proof material.

Hydrogenation may also be effected continuously when the reaction conditions are chosen in such a way that the effective reaction time necessary for quantitative reaction is sufficiently short.

The amount of water added may vary greatly. When a perfluoro-carboxylic acid is employed, at least 4 percent by weight of water are added and advantageously at least 10 percent by weight, when an ester is used. The process according to invention is preferably carried through in the presence of 20 to 100 percent by weight of water, calculated on perfluorocarboxylic acid or ester. As a catalyst there is used finely divided ruthenium, expediently supported on an inert material. The supporting materials which may be used are materials generally employed for this purpose, such as silica gel, aluminum oxide or carbon. A ruthenium on carbon catalyst containing about 5 percent by weight of metal has turned out to be particularly advantageous. These catalysts are commercially available.

The reaction temperatures range between 80° and 240° C., preferably between 110° and 200° C. The temperatures may still be raised or reduced; in the first case, however, an increasing decarboxylation is observed, in the second case, the reaction is uneconomically slow.

The hydrogen pressure (initial pressure) may range between 5 and 700 kp./cm.² (kp. is kilopond or kilogram). Higher hydrogen pressures are not advantageous and therefore uneconomic. There are preferably used pressures of from 40 to 400 kp./cm.².

When hydrogenating at slightly elevated pressures, which is interesting with regard to the cost of high pressure devices, especially for economic reasons, it is preferable to perform the process according to invention in an aqueous medium by addition of a mineral acid. It has been found that even at pressures of from 5 to 40 kp./cm.² excellent yields of 1,1-dihydroperfluoroalkanols are obtained when hydrogenation is effected in the presence of a mineral acid. The amount of the acid added may vary greatly; hydrogenation is expediently carried out in the presence of 50–200 percent by weight, calculated on perfluorocarboxylic acid, of a 0.5 to 2-molar aqueous mineral acid solution. There may be added all strong mineral acids which are not reduced under the reaction conditions, such as hydrohalic acids, sulfuric acid or phosphoric acid. Particularly good results are obtained, if the perfluorocarboxylic acid is hydrogenated at pressures of from 5 to 40 kp./cm.², in the presence of 50–200 percent by weight of a 0.5–2-molar phosphoric acid at temperatures of from 110 to 200° C.

The process according to the invention distinguishes itself by several advantages. The hydrogenation in an aqueous medium avoids all disadvantages caused by the use of inflammable solvents. Furthermore, the catalyst attains a higher activity in water so that 1 percent by weight of the catalyst which contains about 5% of ruthenium, already permits a sufficient reaction speed. Using 3–6 percent by weight of catalyst, nearly quantitative yields are obtained over short reaction times. Moreover, the resulting 1,1-dihydroperfluoroalkanols can easily be separated from the reaction mixtures, since the products are only sparingly or not soluble in water. If the melting point of the product is lower than the boiling point of the aqueous phase the reaction mixture is filtered at a temperature ranging between room temperature and about 100° C., where the product is liquid. Then the two phases of the filtrate are mechanically separated. The lower phase consists of nearly pure 1,1-dihydroperfluoroalkanol which is contaminated by only a small amount of 1-hydroperfluoroalkane resulting from decarboxylation, by traces of not hydrogenated perfluorocarboxylic acid and possibly by some water dragged along in the separation of the phases. If the melting point of the product is above about 100° C., the aqueous phase is filtered off at room temperature and then the solid mixture of catalyst and product is separated by distillation or by distillation with overheated steam. The so-obtained products are sufficiently pure for most of the application fields. Otherwise, a very pure 1,1-dihydroperfluoroalkanol may be obtained by a single rectification.

The compounds obtained according to the present process are very pure. Thus, the 1,1-dihydroperfluorooctanol melts at 42–43° C. and contains 70.4% of fluorine (theoretical value: 71.2% of F), whereas the product obtained following the process of U.S. Pat. No. 2,862,977 melts at 25°–30° C. and contains only 66.3% of fluorine.

The process according to the present invention excels furthermore in providing the desired products in very good yields. In all cases, the yields exceed 80% of the theory. Under favorable working conditions, yields exceeding 90% may be obtained in contrast to U.S. Pat. No. 2,862,977 where only 48% are obtained.

The following examples serve to illustrate the invention.

EXAMPLE 1

320 g. of perfluorooctanoic acid, 160 g. of water and 16 g. of the catalyst were introduced into a 2-liter autoclave made from acid-proof material. As catalyst there was used a commercially available product consisting of about 5% of ruthenium on carbon. 60 kp./cm.$^2$ of hydrogen were pressurized and the contents were heated to 140° C., the pressure increasing to a maximum of 62 kp./cm.$^2$. Pressure was kept between 50 and 60 kp./cm.$^2$ during hydrogenation. After 16 hours the autoclave was cooled to 70° C., pressure was released, the product was removed from the autoclave and suction-filtered at 60°–70° C. over a heated glass frit. The catalyst concentrated on the frit was blown through the steam in order to remove the last remainders of the 1,1-dihydrofluorooctanol from the charcoal. The filtrate consisted of two phases which were separated in the separatory funnel. The upper liquid phase did not contain any organic components and was eliminated. The lower phase which solidified at 35° to 40° C., consisted of 1,1-dihydroperfluorooctanol-1, only contaminated by traces of perfluorooctanoic acid and about 1% of 1-hydroperfluoroheptane resulting from decarboxylation of the starting material. The yield of crude product amounted to about 299 g., i.e. 94% of the theory. By distillation under reduced pressure, pure 1,1-dihydroperfluorooctanol-1, boiling point=94° C. at 50 torr, M.P.=42°–43° C., is obtained.

Yield after distillation: 284 g.=91.8% of the theory.

The following examples only mention the yields of the pure product after distillation.

EXAMPLE 2

100 g. of perfluorooctanoic acid, 100 g. of water and 5 g. of a ruthenium on carbon catalyst were filled into an acid-proof 0.5-liter autoclave. The content was pressurized with 150 kp./cm.$^2$ of hydrogen and heated to 140° C., the pressure increasing to a maximum of 190 kp./cm.$^2$. At higher pressures, refilling of hydrogen was not necessary. After 8 hours the contents were cooled and worked up as described in Example 1. Yield: 85.5 g.=88.5% of the theory.

EXAMPLE 3

Example 2 was repeated, but there was employed an initial pressure of 300 kp./cm.$^2$. While heating to 140° C., the pressure increased to a maximum 372 kp./cm.$^2$. After 5 hours the contents were cooled and worked up. Yield: 87.5 g., corresponding to 90.3% of the theory.

EXAMPLE 4

300 g. of perfluorooctanoic acid, 150 g. of water and 15 g. of ruthenium on carbon catalyst were filled into an acid-proof 2 liter-autoclave. The latter was pressurized with 300 kp./cm.$^2$ of hydrogen and heated to 120° C., the pressure increasing to a maximum of 347 kp./cm.$^2$. The reaction temperature was maintained for 8 hours, then the contents were cooled and worked up. Yield: 263 g. corresponding to 90.8% of the theory.

EXAMPLE 5

150 g. of perfluorooctanoic acid containing about 4% of water, and 7 g. of ruthenium on carbon catalyst were filled into an acid-proof 0.5 liter autoclave. The contents were pressurized with 250 kp./cm.$^2$ of hydrogen and heated up to 180° C. After 12 hours the whole was cooled and worked up. The yield amounted to 128 g., corresponding to 88.4% of the theory.

EXAMPLE 6

100 g. of perfluorooctanoic acid, 100 g. of water and 5 g. ruthenium on carbon catalyst were filled into an acid-proof 0.5-liter autoclave. The content was pressurized with 40 kp./cm.$^2$ of hydrogen and heated to 180° C. During reaction, the pressure was maintained between 45 and 50 kp./cm.$^2$ by refilling with hydrogen. 8 hours later the whole was cooled and worked up. 81.2 g. of the product were obtained, which corresponded to a yield of 83.8% of the theory.

EXAMPLE 7

300 g. of perfluorooctanoic acid, 300 g. of water and 9 g. of ruthenium on carbon catalyst were filled into an acid-proof 2-liter autoclave. The contents were pressurized with 220 kp./cm.$^2$ of hydrogen and heated to 180° C. The pressure increased to a maximum of 284 kp./cm.$^2$. The reaction temperature was maintained for 4 hours, then the content of the autoclave was cooled and worked up. Yield: 264 g.=91.1% of the theory.

EXAMPLE 8

150 g. of perfluorooctanoic acid, 100 g. of water and 4.5 g. of ruthenium on carbon catalyst were filled into an acid-proof 0.5 liter autoclave. The latter was pressurized with 400 kp./cm.$^2$ of hydrogen and heated. At 150° C. and 495 kp./cm.$^2$, the reaction began spontaneously. Within 5 minutes, the temperature raised to 178° C. At 180° C. the whole was allowed to react for still one hour, then it was cooled and worked up. Yield: 130 g.=90.1% of the theory.

EXAMPLE 9

100 g. of perfluorooctanoic acid, 100 g. of water and 5 g. of ruthenium on carbon catalyst were filled into an acid-proof 0.5-liter autoclave. It was pressurized with 60 kp./cm.$^2$ of hydrogen and heated to 200° C. The pressure increased to a maximum of 68 kp./cm.$^2$. During reaction some more hydrogen was introduced under pressure, so that the pressure was maintained between 55 and 60 kp./cm.$^2$. After 6 hours the contents were cooled and worked up. Yield: 79 g.=82.0% of the theory.

EXAMPLE 10

320 g. of perfluorooctanoic acid ethyl ester, 160 g. of water and 16 g. of ruthenium on carbon catalyst were filled into an acid-proof 2-liter autoclave. After pressurizing with 230 kp./cm.$^2$ of hydrogen, the content was heated to 200° C., whereby the pressure increased to a maximum of 303 kp./cm.$^2$. After 3 hours it was cooled and worked up. 280 g. of a pure 1,1-dihydroperfluorooctanol-1 were obtained which corresponded to a yield of 90.8% of the theory.

EXAMPLE 11

500 g. of perfluorooctanoic acid ethyl ester, 250 g. of water and 25 g. of ruthenium on carbon catalyst were filled into a 2-liter autoclave. 250 kp./cm.$^2$ of hydrogen were pressurized into it and heated to 190° C. The pressure increased to a maximum of 290 kp./cm.$^2$. During reaction, hydrogen was added in such an amount that the pressure ranged between 270 and 290 kp./cm.$^2$. After 6 hours the content was cooled and worked up. Yield: 91.3% of the theory.

EXAMPLE 12

100 g. of perfluorooctanoic acid, 100 g. of water and 5 g. of the catalyst were filled into an acid-proof 0.5-liter autoclave. The catalyst consisted of about 5% of ruthenium on aluminum oxide and was prepared in such a way that the corresponding amount of rutheniumtrichloride hydrate was applied on aluminum oxide and subsequently reduced in a stream of hydrogen. 60 kp./cm.$^2$ of hydrogen were pressurized into the autoclave and heated to 140° C. 16 hours later the whole was cooled and worked up. Yield: 77.8 g.=80.5% of the theory.

EXAMPLE 13

300 g. of perfluorooctanoic acid, 300 g. of a 1-molar phosphoric acid and 15 g. of the catalyst were filled into an acid-proof 2-liter autoclave having a double acting magnetically operated agitator. As catalyst there was used a commercially available product which contained about 5 percent by weight of ruthenium on carbon. 8.0 kp./cm.$^2$ of hydrogen were pressurized and the whole was heated to 150° C. The pressure in the autoclave was increasing to a maximum of 16 kp./cm.$^2$. During reaction, pressurizing with hydrogen was continued, so that the pressure always ranged between 12 and 14 kp./cm.$^2$. After 40 hours the whole was cooled to 70° C., pressure was released and the warm reaction mixture was filtered over a glass suction filter. The filter residue was blown through with steam in order to remove any enclosed remainders of the product. The filtrate consisted of two phases which were separated in a separatory funnel. The upper aqueous phase was eliminated. The lower phase consisted of 1,1-dihydroperfluorooctanol-1, contaminated by only about 1% of by-products and traces of perfluorooctanoic acid.

Yield of crude product, which solidified at 35–40° C.: 275 g.=93.2% of the theory.

After distillation under reduced pressure, pure 1,1-dihydroperfluorooctanol-1 was obtained having a boiling point of 94° C. at 50 torr and a melting point of 43° C. with a yield of 265 g.=91.5% of the theory.

EXAMPLE 14

100 g. of perfluorooctanoic acid, 70 g. of a 2-molar phosphoric acid and 4 g. of ruthenium on carbon catalyst were filled into an acid-proof 0.5-liter autoclave. 200 kp./cm.$^2$ of hydrogen were pressurized into it and the whole heated to 140° C. The pressure increased to a maximum of 27 kp./cm.$^2$. During the reaction the pressure was maintained between 24 and 27 pk./cm.$^2$. 10 hours later the content was cooled and worked up. After distillation 86.5 g. of 1,1-dihydroperfluorooctanol-1 were obtained corresponding to 89.4% of the theory.

EXAMPLE 15

150 g. of perfluorooctanoic acid, 150 g. of a 1-molar phosphoric acid and 6 g. of ruthenium on carbon catalyst were filled into an acid-proof 0.5-liter autoclave, 20 kp./cm.$^2$ of hydrogen were pressurized thereto and heated to 180° C. Pressure increased to a maximum of 30 kp./cm.$^2$ and was maintained between 25 and 30 kp./cm.$^2$. After 6 hours the content was cooled and worked up. After distillation, 131 g. of 1,1-dihydroperfluorooctanol-1 were obtained, which corresponded to a yield of 90.3% of the theory.

EXAMPLE 16

100 g. of perfluoroocetanoic acid, 100 g. of a 1 molar hydrochloric acid and 5 g. of ruthenium on carbon catalyst were introduced into an acid-proof 0.5-liter autoclave. The latter was pressurized with 25 kp./cm.$^2$ of hydrogen and heated to 140° C. The pressure increased to a maximum of 34 kp./cm.$^2$ and was maintained between 34 and 30 kp./cm.$^2$ during reaction. After 8 hours the whole was cooled and worked up. 83 g. of 1,1-dihydroperfluorooctanol-1 were obtained, corresponding to 85.7% of the theory.

EXAMPLE 17

100 g. of perfluorobutyric acid, 100 g. of water and 5 g. of ruthenium on carbon catalyst were filled into an acid-proof 0.5-liter autoclave. 60 kp./cm.$^2$ of hydrogen were pressurized into it and the whole was heated to 140° C. During reaction some more hydrogen was introduced by pressure so that the pressure was kept between 60 and 65 kp./cm.$^2$. After 16 hours the content was cooled and pressure was released. The content of the autoclave was filtered off, subsequently, the two phases of the filtrate were separated. The lower phase was distilled at normal pressure. 83.4 g. (89.3% of the theory) of 1,1-dihydroperfluorobutanol-1 were obtained, the boiling point being at 99° C. at 760 torr.

EXAMPLE 18

100 g. of perfluorobutyric acid, 100 g. of a 1-molar phosphoric acid and 5 g. of ruthenium on carbon catalyst were introduced into an acid-proof 0.5-liter autoclave. 20 kp./cm.$^2$ of hydrogen were pressurized and heated to 140 ° C. The pressure increased to 27 kp./cm.$^2$. During reaction it was maintained between 24 and 27 kp./cm.$^2$. After 16 hours the reaction mixture was cooled and worked up. Yield: 82.0 g. (84.8% of the theory) of 1,1-dihydroperfluorobutanol-1.

EXAMPLE 19

100 g. of perfluorononanoic acid, 100 g. of water and 5 g. of ruthenium on carbon catalyst were filled into a 0.5-liter autoclave. 300 kp./cm.$^2$ of hydrogen were pressurized and the content was heated to 140° C. The pressure increased to a maximum of 365 kp./cm.$^2$. After 6 hours the content was cooled and pressure was released. The reaction mixture was filtered off at room temperature and the filter residue, which contained the desired product besides the catalyst, was exposed to a distillation with steam. The two phases of the distillate were separated. The resulting product was distilled once more. The boiling point of the 1,1-dihydroperfluorononanol-1 was 105° C. at 50 torr; melting point=66–68° C. 87.7 g. of 1,1-dihydroperfluorononanol-1 were obtained corresponding to a yield of 90.5% of the theory.

EXAMPLE 20

50 g. of perfluorodecanoic acid, 50 g. of a 2 molar phosphoric acid and 3 g. of ruthenium on carbon catalyst were introduced into a 0.5-liter autoclave. 20 kp./cm.$^2$ of hydrogen were pressurized and the whole was heated to 160° C. The pressure increased to a maximum of 30 kp./cm.$^2$. 12 hours later the content was cooled, and pressure was released. The reaction mixture was filtered and freed to a large extent from the aqueous phase. The filter residue, the mixture of 1,1-dihydroperfluorodecanol-1 and the catalyst was distilled in vacuo. 41.5 g. (85.4% of the theory) of 1,1-dihydroperfluorodecanol-1 were obtained, having a boiling point=136° C. at 100 torr, and a melting point of 90°-91° C.

We claim:

1. In a process for the preparation of a compound of the formula $$C_nF_{2n+1}-CH_2OH$$

in which $n$ is a number of 3 to 12, by hydrogenation of a compound of the formula $$C_nF_{2n+1}-CO_2R$$

in which R is hydrogen or lower alkyl and $n$ is as defined above, at elevated pressure and with a ruthenium catalyst, the improvement comprising hydrogenating in the presence of 4 to 100% by weight, calculated on $C_nF_{2n+1}CO_2R$, of water at a temperature of about 80 to 240° C. and at a pressure of about 5 to 700 kp./cm.²

2. The process as claimed in claim 1, wherein the temperature is about 110 to 200° C.

3. The process as claimed in claim 1, wherein the pressure is 5 to 400 kp./cm.²

4. The process as claimed in claim 1, wherein the hydrogenation is performed in the additional presence of a mineral acid which is not reduced under the reaction conditions.

5. The process as claimed in claim 1, wherein the hydrogenation is performed in the additional presence of phosphoric acid.

6. The process as claimed in claim 1, wherein the hydrogenation is performed in the additional presence of about 50 to 200% by weight, calculated on $$C_nF_{2n+1}CO_2R$$

of a 0.5 to 2-molar aqueous mineral acid, which is not reduced under the reaction conditions, at an initial pressure of about 5 to 40 kp./cm.² and at a temperature of about 110 to 200° C.

7. The process as claimed in claim 1, wherein the hydrogenation is performed in the additional presence of about 50 to 200% by weight, calculated on $$C_nF_{2n+1}CO_2R$$

of a 0.5 to 2-molar aqueous phosphoric or hydrochloric acid, at an initial pressure of about 5 to 50 kp./cm.² and at a temperature of about 110 to 200° C.

8. The process as claimed in claim 1, wherein about 3 to 6% by weight, calculated on $C_nF_{2n+1}CO_2R$, of catalyst are used.

9. The process as claimed in claim 1, wherein a ruthenium catalyst containing about 5% of ruthenium supported on carbon is used.

References Cited

UNITED STATES PATENTS

| | | | |
|---|---|---|---|
| 2,862,977 | 1/1958 | Schreyer | 260—633 |
| 3,356,746 | 12/1967 | Anello et al. | 260—633 |

HOWARD T. MARS, Primary Examiner

U.S. Cl. X.R.

260—676 R